(12) United States Patent
Bluhm et al.

(10) Patent No.: US 12,453,353 B2
(45) Date of Patent: Oct. 28, 2025

(54) CHEMICAL AND BIOLOGICAL DECONTAMINATION FORMULATION WITH ENHANCED BIOCIDAL EFFICACY

(71) Applicant: DECON7 SYSTEMS, LLC, Coppell, TX (US)

(72) Inventors: Matthew A Bluhm, Winnetka, IL (US); Brian Starbuck, Englewood, CO (US); Mark D. Tucker, Albuquerque, NM (US)

(73) Assignee: DECON7 SYSTEMS, LLC, Scottsdale, AZ (US)

( * ) Notice: Subject to any disclaimer, the term of this patent is extended or adjusted under 35 U.S.C. 154(b) by 0 days.

(21) Appl. No.: 16/209,960

(22) Filed: Dec. 4, 2018

(65) Prior Publication Data

US 2019/0104740 A1 Apr. 11, 2019

Related U.S. Application Data

(63) Continuation of application No. PCT/US2018/037817, filed on Jun. 15, 2018.

(60) Provisional application No. 62/618,098, filed on Jan. 17, 2018, provisional application No. 62/618,104, filed on Jan. 17, 2018, provisional application No. 62/618,096, filed on Jan. 17, 2018, provisional application No. 62/618,100, filed on Jan. 17, 2018, provisional application No. 62/618,095, filed on Jan. 17, 2018, provisional application No. 62/520,372, filed on Jun. 15, 2017.

(51) Int. Cl.
| | | |
|---|---|---|
| *A01N 59/00* | (2006.01) | |
| *A01N 25/02* | (2006.01) | |
| *A01N 33/12* | (2006.01) | |
| *A62D 3/00* | (2006.01) | |
| *A62D 3/38* | (2007.01) | |
| *A62D 101/26* | (2007.01) | |

(52) U.S. Cl.
CPC .............. *A01N 59/00* (2013.01); *A01N 25/02* (2013.01); *A01N 33/12* (2013.01); *A62D 3/00* (2013.01); *A62D 3/38* (2013.01); *A62D 2101/26* (2013.01)

(58) Field of Classification Search
CPC ........ A01N 59/00; A01N 33/12; A01N 25/02; A62D 3/00; A62D 3/38; A62D 2101/26
See application file for complete search history.

(56) References Cited

U.S. PATENT DOCUMENTS

| | | | |
|---|---|---|---|
| 6,361,787 B1 * | 3/2002 | Shaheen | A01N 49/00 514/762 |
| 6,423,678 B1 * | 7/2002 | Brumbaugh | A61K 8/40 510/235 |
| 6,566,574 B1 | 5/2003 | Tadros et al. | |
| 6,723,890 B2 | 4/2004 | Tucker et al. | |
| 7,125,497 B1 * | 10/2006 | Tucker | A62D 3/30 252/188.21 |
| 7,271,137 B2 * | 9/2007 | Tucker | A61K 33/00 252/186.41 |
| 7,276,468 B1 | 10/2007 | Tucker | |
| 8,609,149 B2 * | 12/2013 | Callahan | C11D 3/48 424/605 |
| 2003/0158459 A1 * | 8/2003 | Tucker | A61K 2300/00 588/303 |
| 2007/0289614 A1 * | 12/2007 | McDonnell | A01N 59/00 134/42 |
| 2010/0086510 A1 * | 4/2010 | DiCosimo | C11D 3/361 424/76.1 |
| 2013/0338420 A1 | 12/2013 | Willey | |
| 2020/0345012 A1 | 11/2020 | Bluhm | |

FOREIGN PATENT DOCUMENTS

| | | |
|---|---|---|
| CN | 102595908 A | 7/2012 |
| CN | 103068225 A | 4/2013 |
| CN | 106413761 A | 2/2017 |
| EP | 2861707 A2 | 4/2015 |
| JP | 2004-501731 A | 1/2004 |
| JP | 2005504856 A | 2/2005 |
| JP | 2008-266375 A | 11/2008 |
| JP | 2012519702 A | 8/2012 |
| JP | 2015525276 A | 6/2013 |
| WO | 9817763 A1 | 4/1998 |
| WO | 0202192 A1 | 1/2002 |
| WO | 03028429 A2 | 4/2003 |
| WO | 2003028429 A2 | 4/2003 |

(Continued)

OTHER PUBLICATIONS

"Quaternary Ammonium, antiseptics and disinfectants," <https://www.aldebaransistemas.com/en/quaternary-ammonium-antiseptics-and-disinfectants/>, published May 3, 2016, p. 1-3.*
"Ethylene Glycol and Propylene Glycol Toxicity: What is Propylene Glycol?" <https://www.atsdr.cdc.gov/csem/csem.asp?csem=12&po=14>, Agency for Toxic Substances & Disease Registry, published Oct. 3, 2007, p. 1-8.*
Stepan Chemical Co., Product Bulletin on the BTC® 885/888 Series, (downloaded Aug. 22, 2022 from https://pt.stepan.com/content/dam/stepan-dot-com/webdam/website-product-documents/product-bulletins/surfactants/BTC88SERIES.pdf) (Year: 2017).*
US-EPA document stating the active ingredients for Variquat® 80MC (downloaded Aug. 22, 2022 from https://www3.epa.gov/pesticides/chem_search/ppls/018533-00004-19740501.pdf; dated 1974). (Year: 1974).*

(Continued)

*Primary Examiner* — Michael P Cohen
(74) *Attorney, Agent, or Firm* — Venable LLP; Keith G. Haddaway; Hemant Khanna

(57) ABSTRACT

An improved formulation may include an enhanced ability relative to its predicates to destroy toxic threats in the form of sporulated bacteria, bacteria protected by biofilms, planktonic bacteria, fungus, viruses, chemical weapons, toxic chemicals including Fentanyl, its analogs, and a whole host of toxic industrial chemicals. The formulation may include a three part product composed of a buffered detergent chemical system, a hydrogen peroxide chemical system and an accelerator system designed to deliver activated peroxygen species when blended together.

8 Claims, 2 Drawing Sheets

(56) References Cited

FOREIGN PATENT DOCUMENTS

| WO | 2005089100 | A2 | 9/2005 |
|---|---|---|---|
| WO | 2005113735 | A1 | 12/2005 |
| WO | 2011156398 | A | 12/2011 |
| WO | 2011156398 | A1 | 12/2011 |
| WO | 20130062127 | A1 | 10/2012 |
| WO | 2016202879 | A1 | 12/2016 |
| WO | 2018232281 | A1 | 12/2018 |

OTHER PUBLICATIONS

Phelps, Fleur, "A Practical Guide to Chemical Process Optimization: Analysis of a Styrene Plant" (2016). Honors Theses. 338. (Year: 2016).*
International Search Report & Written Opinion dated Sep. 17, 2018 issued in PCT/US2018/037817, 9 pages.
Betty et al., Enhanced Micellar Catalysis LDRD, Sandia Report, Dec. 2012 [Retrieved on Aug. 2, 2018]. Retrieved from the Internet: <URL: https://prod.sandia.gov/techlib-noauth/access-control.cgi/2012/1210608.pdf> pp. 1-3, 8-18, 20-55.
Singh et al., Decontamination of Chemical Warfare Agents, Defence Science Journal, vol. 60, No. 4, Jul. 2010 [Retrieved on Aug. 2, 2018]. Retrieved from the internet: <URL: http://publications.drdo.gov.in/ojs/index.php/dsj/article/viewFile/487/245> pp. 428-441.
FireRescue1, "Neutralize carcinogens and other hazards on the job with a decontamination solution", Jan. 2, 2018 (Jan. 2, 2018), retrieved on Mar. 13, 2019 from https://www.firerescue1.com/fire-products/hazmat-equipment/articles/371201018-Neutralize-carcinogens-and-other-hazards-on-the-job-with-a-deconta%E2%80%A6/.
Hazmat, "DECON7—Fogging Solution", Mar. 19, 2016 (Mar. 19, 2016), retrieved on Mar. 14, 2019 from https://www.google.com/search?q=inurl%3Ahttps%3A%2F%2Fwww.hazmat-control.com%2Fproducts%2Fdecon7-fogging-solution%2Fdetail%2F&rlz=1C1GGRV_enUS763US763&oq=inurl%3Ahttps%3A%2F%2Fwww.hazmat-control.com%2Fproducts%2Fdecon7-fogging-solution%2Fdetail%2F&aqs=chrome..69i57j69i58.2665j0j8&sourceid=chrome&ie=UTF-8&as_ qdr=y15.
Inernational Search Report and Written Opinion for Application No. PCT/US19/14016, date of mailing Apr. 10, 2019, 11 pages.
International Search Report and Written Opinion for Appl. No. PCT/US19/14018, date of mailing Apr. 12, 2019, 14 pages.
International Search Report and Written Opinion for Appl. No. PCT/US19/14023, date of mailing Apr. 12, 2019, 15 pages.
International Search Report and Written Opinion for Application No. PCT/US19/14020, date of mailing Apr. 10, 2019, 12 pages.
International Search Report and Written Opinion for Application No. PCT/US19/14025, date of mailing Apr. 3, 2019, 14 pages.
Stepan, "BTC 8358" Jul. 14, 2016 (Jul. 14, 2016), retrieved on Mar. 14, 2019 from https://web.archive.org/web/20160714174524/https://www.stepan.com/products/Surfactants/BTC%C2%AE/BTC%C2%AE-8358.aspx.
Stepan, "BTC 888" Aug. 22, 2016 (Aug. 22, 2016), retrieved on Mar. 14, 2019 from https://web.archive.org/web/20160822222558/https://www.stepan.com/Products/Surfactants/BTC%C2%AE/BTC%C2%AE-888.aspx.
Chinese Office Action with translation for App. No. CN201880047023.4, dated Sep. 14, 2020, 20 pages.
International Search Report and Written Opinion for Application No. PCT/US2019/064558, dated Feb. 3, 2020, 14 pages.
International Preliminary Report on Patentability for App. No. PCT/US2019/064558, dated Jun. 8, 2021, 12 pages.
Betty R. G. et al.: "Enhanced Micellar Catalysis LDRD", Sandia Report SAND2012-10608, Dec. 2012, pp. 1-61, XP055556342.
Supplementary Search Report for App. No. EP19741127, dated Nov. 12, 2021, 13 pages.
Supplementary Search Report for App. No. EP19741521.9, dated, 13 pages.
BTC8358, https://www.stepan.com/content/stepan-dot-com/en/products-markets/product/BTC8358.html.
BTC888, https://www.stepan.com/content/stepan-dot-com/en/products-markets/product/BTC888.html.
Supplementary Search Report for App. No. EP19741758.7, dated, 14 pages.
Supplementary Search Report for App. No. EP19741692.8, dated, 13 pages.
Supplementary Search Report for App. No. EP19741840.3, dated, 13 pages.
Chinese Office Action for App. No. CN201880047023.4, dated Apr. 13, 2021, 7 pages.
"Water Treatment Chemical Preparation and Application Guide" Zhang Guanghua (Ed.) (2003), pp. 68-69.
Police1, "Defend yourself against exposure to drugs and diseases with a ready-to-use decontamination spray" (Dec. 26, 2017); Internet: https://www.police1.com/police-products/duty-gear/articles/defend-yourself-against-exposure-to-drugs-and-diseases-with-a-ready-to-use-decontamination-spray-leNIxvTOYnyWPvwJ/.

* cited by examiner

CHEMICAL AND BIOLOGICAL DECONTAMINATION FORMULATION WITH ENHANCED BIOCIDAL EFFICACY

CROSS-REFERENCE TO RELATED APPLICATIONS

This nonprovisional patent application claims priority to a provisional application Ser. No. 62/618,095, filed on Jan. 17, 2018; a provisional application Ser. No. 62/618,096, filed on Jan. 17, 2018; a provisional application Ser. No. 62/618,098, filed on Jan. 17, 2018; a provisional application Ser. No. 62/618,100, filed on Jan. 17, 2018; and a provisional application Ser. No. 62/618,104, filed on Jan. 17, 2018; where the entire disclosures of the above identified provisional applications are incorporated by reference herein. This nonprovisional patent application further claims priority to a PCT international application number PCT/US18/37817, filed on Jun. 15, 2018, which further claims priority to a provisional application Ser. No. 62/520,372, filed on Jun. 15, 2017, and these applications' disclosures are incorporated by reference in their entirety herein.

TECHNICAL FIELD

Embodiments of the present invention relate to formulations for neutralization of chemical, biological and industrial toxins. In other embodiments, aspects of the present invention relate to formulations for the treatment of bacteria cocooned or protected by biofilms.

BACKGROUND OF THE INVENTION

Prior art includes materials containing solubilizing compounds and reactive compounds that include at least two solubilizing compounds, wherein at least one solubilizing compound is a cationic surfactant and at least one solubilizing compound is a cationic hydrotrope. Also, the prior art compounds include at least one reactive compound is selected from the group consisting of hydrogen peroxide, urea hydrogen peroxide, hydroperoxycarbonate, peracetic acid, sodium perborate, sodium peroxypyrophosphate, sodium peroxysilicate, and sodium percarbonate; and at least one water-soluble bleaching activator selected from the group consisting of ethylene glycol diacetate, propylene glycol monomethyl ether acetate, methyl acetate, dimethyl glutarate, diethylene glycol monoethyl ether acetate, and propylene glycol diacetate, and combinations thereof. In one embodiment, at least two solubilizing compounds, at least one reactive compound, and at least one water-soluble bleaching activator are mixed with water and exposed to at least one toxant to neutralize one toxant.

However, improvements are desirable for treatment of toxic chemicals including Fentanyl, its analogs and a broader spectrum of nonpolar toxants. Further, improvements relating to the ability to disrupt, distort and destroy biofilms are desirable.

SUMMARY

According to one embodiment, an improved formulation, to be abbreviated for the purpose of simplicity and to be referred to as "D7-2.0" includes an enhanced ability relative to its predicates to destroy toxic threats in the form of sporulated bacteria, bacteria protected by biofilms, planktonic bacteria, fungus, viruses, chemical weapons, toxic chemicals including Fentanyl, its analogs, and a whole host of toxic industrial chemicals. In one embodiment, D7 2.0 may include a three part product composed of a buffered detergent chemical system, a hydrogen peroxide chemical system and an accelerator system designed to deliver activated peroxygen species when blended together.

BRIEF DESCRIPTION OF DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

Figure 1:
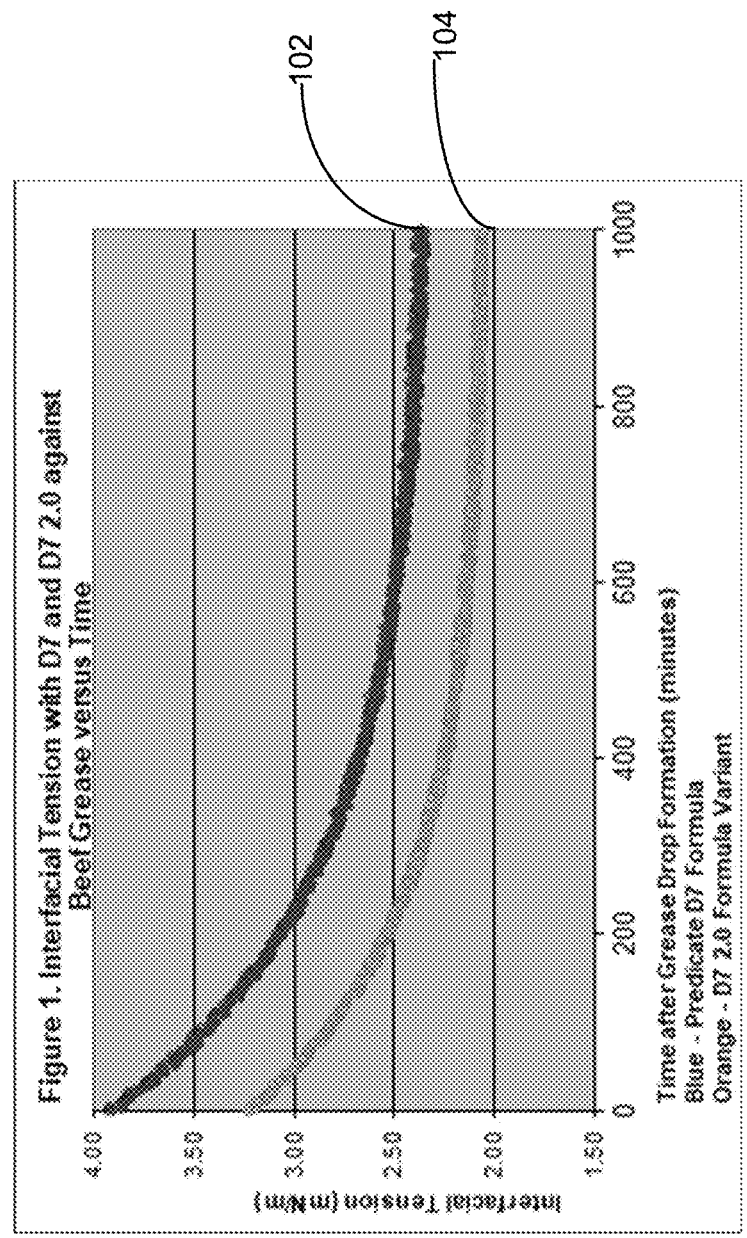
FIG. 1 is a graph illustrating interfacial tension test results comparing a first formulation to an improved formulation according to one embodiment of the invention.
Figure 2:
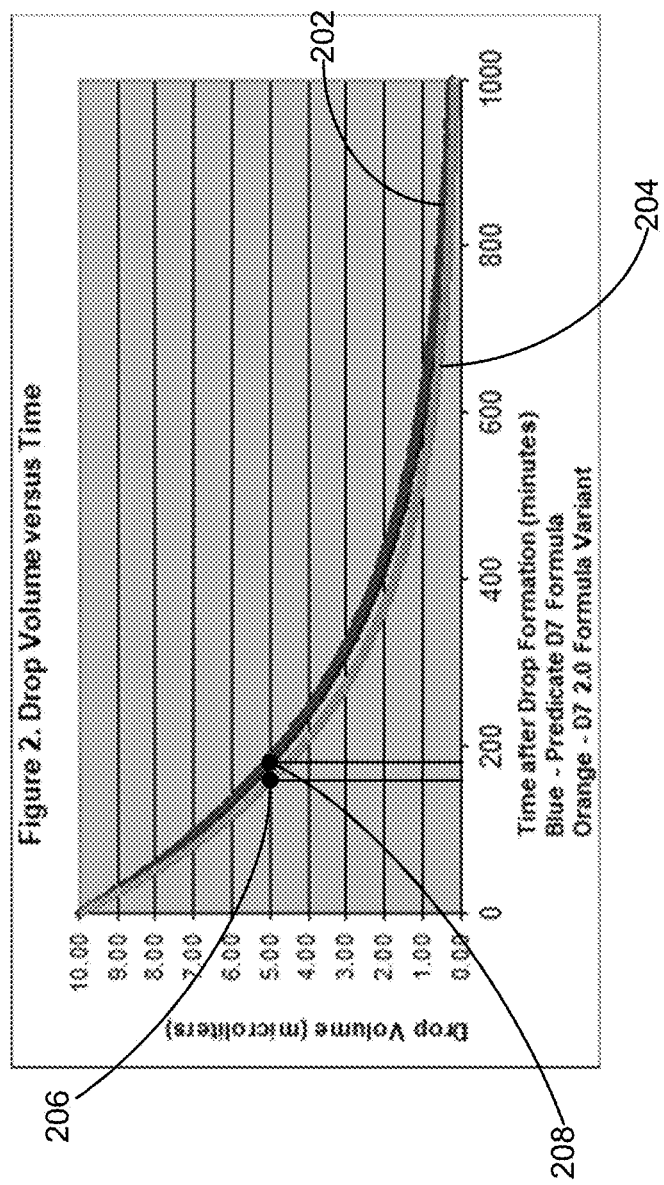
FIG. 2 is a graph illustrating a test result of drop volume versus time between a first formulation and an improved formulation according to one embodiment of the invention.

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments of the invention describe an enhanced chemical formulation designed for the decontamination, disinfection and renewal of surfaces exposed to chemical, biological and toxic industrial contaminants and residues. This formula improves on prior art by expanding the efficacy spectrum, decreasing treatment time, modifying chemical properties allowing for lower effective dosage and broadening the roster of chemical agents remediated by it. The formulation described herein may also be applied in variable concentrations to achieve decontamination objectives (cleaning, sanitization, disinfection, high level disinfection, mold remediation, biofilm remediation, targeted decontamination).

Embodiments of the invention aim to incremental variants designed to perform particular tasks is the intent of this effort. In one embodiment, aspects of the invention may be formulated with a Generation 1 version of Quaternary amine (ADBAC). It is thought that broadening the type of quaternary amine may bring a benefit in either efficacy against a broader range pathogens or greater effectiveness against biofilms. Of the two, biofilm effectiveness is likely the prominent value proposition. Taking a view of the relationship of the quat generation, the following comparison is relevant.

Generation 5 Quaternary Amine. This category is a mixture of generation 1 and generation 4. The innovation options can rapidly multiply when one considers permutations of different generation 1 chemistries along with the generation 4 variants. The most accessible options include;

| Vendor | Product | Description | Notes |
|---|---|---|---|
| Stepan Pilot | BTC-1210 | 80% Active 32% CAS 68424-85-1 | Different foaming characteristics, different efficacy profile, different physiochemical |
| | Maquat 2420-80% | 48% CAS 7173-51-5 | performance, enhanced biofilm defeat efficacy, residual sanitation performance |
| Stepan Pilot | BTC-888 | 80% Active 32% CAS 68424-85-1 | Different foaming characteristics, different efficacy profile, different physiochemical |
| | MQ-624M | 48% Variable dialkyl, dimethyl | performance |

| | Prescribed amount |
|---|---|
| Part A Formulation Ingredient | |
| BTC 888 (80% active) 32% (40% C12, 50% C14, 10% C16) + 48% DADMAC | 0.1 to 4.00% |
| Octyl Decyl Dimethyl Ammonium Chloride (24%) MW = 334.0273 | 0.024 to 0.960% |
| Di-n-Octyl Ammonium Chloride (12%) MW = 270.5207 | 0.012 to 0.480% |
| Di-n-Decyl Ammonium Chloride (12%) MW = 326.6279 | 0.012 to 0.480% |
| ADBAC C12 (40%) MW = 339.9909 | 0.0128 to 0.512% |
| ADBAC C14 (50%) MW = 368.0445 | 0.016 to 0.640% |
| ADBAC C16 (10%) MW = 396.0981 | 0.0032 to 0.128% |
| Adogen 477D (50% Active) | 0.05 to 2.00% |
| Glycol Ether DB | 0.4 to 1.60% |
| Isobutanol | 0.025 to 1.00% |
| Propylene Glycol | 0.5 to 20.00% |
| Lauryl Alcohol | 0.02 to 0.80% |
| Potassium Bicarb USP Anhyd | 0.3 to 12.00% |
| Caustic Potash | 0.0425 to 1.70% |
| Water | 56.90 to 98.56% |
| Part B Formulation Ingredient | |
| Hydrogen peroxide | 0.2 to 8.00% |
| Inerts and stabilizers Water | 99.8 to 85% |
| Part C Formulation Ingredient | |
| Bleaching accelerator | 0.05 to 2.00% |

This embodiment of the invention may have different physical properties. The efficacy profile of this version will also be different. The development of the efficacy profile should be from a dilute version, perhaps a 1 to 100 dilution of the final product, up to the full version. The dilute version might be considered for surfaces that are already clean and devoid of biofilm presence. In one embodiment, the concentrated version would be considered for circumstances where gross filth is more prevalent (live animal facilities, processing plants, high biofilm potential places). Various embodiments of the invention for different dilutions (bacteria, biofilm, fogging efficacy) may enable various levels of applications in addition to those disclosed in the present application.

This improvement upon prior art enables the contemplation of a full spectrum product capable of dealing with sensitive cleaning and sanitization situations like those encountered in food contact circumstances. In those circumstances, a product may be able to be applied to a target surface usually as a spray and wiped down distributing the cleaning/sanitization formulation over the entire surface. In one embodiment, aspects of the invention may need to receive approval from regulatory oversight agencies before use. In this case, this is commonly known as a "leave-on" product. There are statutory limits of labeled ingredients permissible for this type of use. It is an embodied intention of this improvement to enable this type of use. A full strength version of the product is intended for use in highly compromised environments like live animal barns where significant gross filth is anticipated. This represents the other end of the product spectrum. Regulatory oversight is also a requisite in relation to pesticidal embodiments. It is anticipated that there will be many situations in between these two extremes where a strength modulated product would serve the need. Examples of such situations are given in spectrum above.

In one embodiment, aspects of the invention include a three-part formulation that are provided below:

Part 1. A buffered detergent chemical system may include:

| Ingredient | % in formula |
|---|---|
| Generation 5 Quat | <10% |
| Hydrotrope | <10% |
| Surfactant blending, foam stabilizing, cosolvent formulation system | 20 to 70 |
| pH buffering system | 0.1 to 20 |
| Water | Balance |

In one embodiment, hydrotrope comprises Gen 6 Quat. In another embodiment, the surfactant system comprises one or more of the following: isobutyl alcohol, diethylene glycol monobutyl ether, propylene glycol, and lauryl alcohol. In another embodiment, the pH buffering system may include potassium bicarbonate, potassium carbonate, etc.

Part 2. A hydrogen peroxide chemical system may include:

| Ingredient | % in formula |
|---|---|
| Hydrogen peroxide | <20% |
| Stabilizer | <2% |
| Gettering agent | <2% |
| Water | Balance |

In one embodiment, the stabilizer may include phosphoric acid. In a further embodiment, the gettering agent may include a phosphonate salt.

Part 3. An accelerator system may include:

| Ingredient | % in formula |
|---|---|
| Accelerator | 100 |

In one embodiment, the accelerator system comprises diacetin.

Moreover, embodiments of the invention prepare the above three parts formulation in the following desirable proportions by volume or concentration:

Part 1 about <50%
Part 2 about <50%
Part 3 about <10%

In one embodiment, as a brief description, quaternary ammonium ("Quat") are classified as:

First Generation of Quaternary Ammonium ("Gen 1 Quat")

Benzalkonium chloride, also known as nalquil dimethyl benzyl, wherein the alkyl chain can have variations in the composition of decarbon number chloride. The alkyl chains of 12 and 14 carbons, are those with greater antibacterial power. This first generation emerged over 50 years ago, is the one with lowest since biocidal activity and has many years in the market for disinfection applications, there may be as bacterial resistance to the product. However, this molecule is still widely used in hospital and veterinary disinfection, bactericidal and deodorant use foot powders and topical disinfectants.

Second Generation of Quaternary Ammonium ("Gen 2 Quat")

Chemical name: of nalquil ethyl benzyl dimethyl ammonium chloride, that is, has an ethyl radical in the aromatic ring.

Third Generation of Quaternary Ammonium ("Gen 3 Quat")

The mixture of the first two generations of quaternary: benzalkonium chloride (1st Generation) chloride and alkyl dimethyl benzyl ammonium chloride (2nd Generation). The mixture of these two quaternary it have an increased biocidal activity, increased detergency and increased user safety by a relatively low toxicity. The use of the mixture helps to prevent bacterial resistance to continued use of a single molecule.

Fourth Generation of Quaternary Ammonium ("Gen 4 Quat")

They called "Twin or Dual Chain quats" or quaternary "twin chain" are quaternary products with linear dialkyl chains without benzene ring, such as didecyl dimethyl ammonium chloride or chloride, dioctyl dimethyl ammonium chloride or the like, each isolated. These quaternaries are superior in germicidal activity are low foaming and have a high tolerance to protein loads and hard water. Recommended for disinfection in food and beverage industry, because it can be applied by low toxicity.

Fifth Generation of Quaternary Ammonium ("Gen 5 Quat")

Mixture of the fourth generation with the second generation, that is, didecyl dimethyl ammonium chloride+alkyl dimethyl ammonium chloride, alkyl benzyl ammonium dimethylethylbenzyl other varieties according to the formulations.

In one embodiment, the formulation may maintain their activities described in prior art associated with the predicate relative to their ability to treat surfaces contaminated with Chemical Weapon (CW), Toxic Industrial Chemicals (TICs), Bacteriological Pathogens, Pathogenic Viruses afflicting human and animal hosts, Fungus and Mildew infestations and Biofilm forming bacteria colonies. Aspects of the invention may provide substantial improvement by virtue of their ability to reduce the interfacial tension relative to the predicate(s). In one embodiment, the interfacial tension reduction manifests itself by rapidly disrupting, distorting and destroying biofilms and consequently delivering pesticidal efficacy to the underlying colony(s). Additionally, embodiments of the invention improve over the prior technology in expanding the scope of toxant treatment efficacy by the same interfacial tension reduction mechanism which enables improved uptake of nonpolar toxants into the decontamination realm of the formulae.

In one embodiment, the formulation D7 2.0 is non-toxic, safe to use on human contact surfaces and suitable for sensitive food processing facilities. In another embodiment, D7 2.0 may be diluted to levels appropriate to the application (like no rinse mild table top sanitization where <400 ppm of sanitizing agent is sufficient for effect up to >16000 ppm for high level disinfection where sporulated and biofilm cocooned pathogens as well as highly dangerous CW are involved) and may be capable of retaining virucidal and bactericidal efficacy. In one embodiment, D7 2.0 may be applied by a delivery system such as the system for mixing and dispensing fluids disclosed in U.S. Pat. Nos. 9,855,572, and 9,856,072; and U.S. Design Pat. Nos. D799,008, D822, 163, and D822,164, all assigned to the Applicant of the present application. These pesticidal efficacy claims are regulated by the Environmental Protection Agency under strict guidelines requiring adherence to standard microbiological methodology under the umbrella of Good Laboratory Practices.

In one example, some disinfection situations require a full strength application of the D7 2.0. Situations like surface decontamination or disinfection of highly soiled environments require a full strength dosage. In another embodiment, treatment of lightly soiled surfaces may only need a diluted version of the formula to achieve acceptable treatment (either disinfection or decontamination). Embodiments of the invention integrate a generation 5 quaternary amine package providing a broader efficacy spectrum for both disinfection and decontamination. One of the aspects of the invention may be that it may be easily modified or "throttled" to enable the efficient treatment of surfaces with variable surface energies.

D7 2.0 may be an aqueous based formulation with enhanced ability to rapidly treat surfaces afflicted with biological or organic chemical toxic threats. Those toxic threats may take the form of chemical agents, toxins or other substances which pose threat to human, animal or food supply health. In the case of chemical contamination, embodiments of the invention serve as a decontamination agent. Toxic threats from bacteriological sources (sporulated bacteria, biofilm encased bacteria, planktonic bacteria, viruses, fungi or mildew) are also targeted agents of these enhanced formulae in their form as a disinfectant.

A chemical or bacteriological contagion prescribes that time and destructive efficacies are the highest priorities to reduce the opportunity of proliferation of the contagion agent via aerosolization, dust lifting or other modes of spreading. As an example, in the case of encountering a potent chemical agent like Fentanyl or its derivatives, fast effective treatment (<5 minutes for 99.9% destruction) may be desirable to render the human occupied space safe for responders and occupants. Moreover, efficacy or speed of treatment may be measured in seconds up to minutes depending and varying with circumstances. For example, in the case of disinfection, a common efficacy timeframe may be 10 minutes. In one aspect, this timeframe is prescribed largely as a result of the expense involved in testing.

In one example, each time point tested might cost several thousand dollars to measure a result. In the case of decontamination, testing costs also limit time point studies. In one example, minutes may be the usual target. The speed performance of a disinfection or decontamination strategy is dependent upon: the physiochemical nature of the agent to be treated; the surface to be treated; or the amount of filth that needs to be overcome.

In one example, the theme that may play itself out in many circumstances where control of a toxic or pathogenic spread is necessary to assure safety of occupants (human or animal), food supply, husbandry facilities, human contact surfaces, health care facilities, etc. It may be difficult to apply mechanical disruption to affected surfaces due to their inaccessibility to human reach or the desire to not disturb potentially hazardous substances. Therefore, chemical potency may called on to react with threats to eliminate them. In one example, the complex surfaces and hidden areas beyond human reach may be numerous in facilities where sanitization is critical. Chemical treatment may be the only means by which sanitization potency can be delivered. It is very difficult to apply mechanical disruption force to every critical surface. Recent fatal bacteria borne outbreaks emphasized the fact that equipment sanitization was a possible vector in spreading of *listeria*.

In all cases, the agent(s) causing the fatal demise of the pathogenic target must come into reactive proximity of the pathogen or toxin. In this example, it may mean molecular dimension proximity. If a substance is not in the same physical state at the decontamination agent, neutralization may become less likely. Gases permeate many areas but are problematic in practice. For a liquid to be effective, it must be able to solubilize a toxant or be able intimately contact a pathogen.

In one prior technology, predicate versions of DF200 were invented for the rapid and complete treatment of surfaces contaminated with CW or TICs. However, it was not until later that the disinfection efficacy activity of the predicate formulae was applied to biota. For example, some prior technology focuses on efficacy directed to chemical warfare agents or threats. However, no or little focus has placed on the efficacy of killing bacteria or viruses when treating different surfaces. Numerous pesticidal claims have been recognized by the EPA for formulary variants of DF200.

These pesticidal claims were essential to bringing the potency of DF200 to critical markets where biotic contagion threatens human beings and operations essential to the general welfare. It was quickly realized that planktonic bacteria destruction was one level of treatment needed for surface treatment, which DF200 lacks. Current methods designed for assessment of disinfectant efficacy focus on planktonic (free floating or nonaggregated) bacteria. The progressive threat of biota encased in biofilms represented an elevated and persistent problem afflicting sensitive operations where pathogenic outbreaks mays cause significant harm to people, essential food supplies and other critical areas essential for the general welfare. Standard disinfection strategies failed to treat the issue. This failure is primarily due to the fact that most disinfectants do not efficiently penetrate the nonpolar biofilm protective layer. DF200 predicates were evaluated against biofilm protected pathogens and its efficacy was demonstrated.

In one embodiment, the essential performance metric for assessing the formulae D7 2.0 may include interfacial tension (IFT). IFT is the force exerted by a liquid in contact with a solid or another liquid. In treating a surface, the IFT between the contaminant and the surface must be overcome to clean the surface. When a biofilm gains a foothold on a surface, both the biofilm/surface interface and the cohesive forces holding the biofilm together must be disrupted to effectively treat the contagion.

Biofilms are surfaces that may be naturally water repellent. To disrupt them, a treatment must be able to hydraulically pry its way into the biofilm matrix. In one example, biofilms may be composed of a complex series of chemicals including proteins, polysaccharides and other chemicals that coagulate together and are designated as "EPS", Extracellular Polymeric Substances. The EPS layer may be hydrophobic (repels water) in nature and thus naturally may be resistant to water based disinfectants. The biofilm itself may be resistant to chemical treatments targeting pathogens embodied in the film by resisting penetration into its matrix. This behavior has been actively studied and documented by numerous researchers.

In one embodiment, to eradicate the pathogenic bacteria protected by the biofilm, both adhesive and cohesive forces must be overcome. The principles defining this interaction translate also into the area of decontamination in that the adhesive forces holding a toxin onto a surface must be overcome to facilitate removal and eventual destruction. Adhesive forces may be categorized by, for example, many different types of interactions. In one aspect, the net adhesive force may be the sum of forces that enable a substance to stick to a surface. In another example, a surface may include a particular affinity for different substances. In the example, the forces that keep a contaminant on a surface (therefore in a state of threat) may be overcome to move it to the realm where it may then react in solution with the activated chemistry induced by the presence of hydrogen peroxide or be rinsed away. D7 2.0 described below may target, in one embodiment, the modulation of these forces in a way that is unique and not obvious and produce unexpected results.

Example 1: Experiment 1

Modification of interfacial tension characteristics of the D7 2.0 may be the essence of the invention. As provided above, interfacial tension is the force that must be overcome between the barrier separating two immiscible phases. The principles underlying this behavioral property are well documented. In one embodiment, the lower the interfacial tension, the more vulnerable the interface is to the penetration of water and the reactive activated oxygen species germane to the formulation. As an example, in experiment 1, a drop of beef grease in contact with water will not be dissolved and will remain intact indefinitely for all intent and purposes. The interfacial tension between beef grease and water may be about 20 to 30 millinewton/meter (mN/m). The x-axis represents time after grease drop formation in minutes.

In this experiment, the beef grease proxy was then exposed to the D7 predicate 102 and D7 2.0 variant 104, where the D7 predicate 102 may not include the mixture of D7 2.0. The plot illustrated in FIG. 1 may demonstrate the reduction of interfacial tension of D7 2.0 in contact with beef grease based on the line 104. Also illustrated on the plot is the interfacial tension of the D7 predicate in contact with the same beef grease proxy. The initial interfacial tension in both cases renders the beef grease vulnerable. The generation 5 (gen 5) variant in D7 2.0, according to this embodiment, may show a greater proclivity for surface tension reduction than the variant. This fact demonstrates a potent and non obvious benefit for treatment of hydrophobic surfaces and toxants using the D7 2.0 formulation.

Example 2: Experiment 2

Surface chemistry modification measurement may be achieved by employing a proprietary surface chemistry Pendant drop analysis method that may measure the volume and shape of a defined droplet versus time reckoned from initial exposure to the test formulation. This measurement may utilize a sophisticated imaging technique that continuously calculates the pendant drop volume and shape. The time to achieve 50% of the initial drop volume is one of the performance figures of merit which was noted and compared to different formulation variants. A typical plot result is shown in FIG. 2.

In one embodiment, the shift of an orange curve 204 to the left from a blue curve 202 upon exposure to the D7 2.0 variant may indicate a more rapid cleaning action. The t½ volume time was 157 minutes at 206 for the D7 2.0 represented by the orange curve 204 variant compared to 185 minutes at 208 for the D7 predicate, as represented by the blue curve 202. This represents a 15% improvement in decontamination performance relative to the predicate.

In one embodiment, this interfacial tension problem is one of the reasons biofilms are resistant to standard disinfectants. The surface of the biofilm are non polar in a manner similar to that of beef grease and behaves in such a way as to repel aqueous based disinfectants. In another embodiment, D7 and to a greater extent D7 2.0 may reduce the interfacial tension energy barrier present between immiscible layers. In one example, biofilm protected colonies were cultured and exposed to the D7 predicate and D7 2.0 variant. The biofilm protected colony was enumerated at $8.736 = \log_{10}[\text{CFU/cm}^2]$. Following treatment with the predicate D7 formula, a 5.2 log reduction of bacteria was measured. Following treatment with the D7 2.0 variant formula, an 8.7 log reduction of bacteria was measured. In one aspect, this may complete eradication of the biofilm protected colony. Moreover, this experiment further demonstrates the improved efficacy of the D7 2.0 variant over the D7 predicate.

In addition, D7 2.0 has been approved as a disinfectant or sanitizer pesticide against;

*Staphylococcus aureus* [(ATCC 6538)] [Staph]
*Salmonella enterica* [(ATCC 10708)] [*Salmonella*]
*Pseudomonas aeruginosa* [(ATCC 15442)]
Avian influenza A (H3N2) Reassortant Virus
Avian Influenza A (H5N1) Virus
Avian Influenza A (H7N9) Virus
*Porcine* Epidemic Diarrhea Virus
*Listeria monocytogenes* [(ATCC 15313)]
*Escherichia coli* [(ATCC 11229)]

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A chemical formulation comprising Part A, Part B and Part C components in a ratio of 49:49:2, wherein:

Part A comprises:

a composition in an amount 4% by weight of Part A, wherein the composition comprises 80% active ingredients, namely:

32% by weight of n-alkyl-(40% C12, 50% C14, 10% C16)-dimethylbenzylammonium chloride, 24% by weight of n-octyldecyldimethylammonium chloride, 12% by weight of di-n-octyldimethylammonium chloride, and 12% by weight of di-n-decyldimethylammonium chloride;

N, N, N,N', N'-pentamethyl-N'-(tallow alkyl)-trimethylenediammonium dichloride in an amount 2% by weight of Part A;

diethylene glycol monobutyl ether in an amount 1.6% by weight of Part A;

isobutanol in an amount 1% by weight of Part A;

propylene glycol in an amount 20% by weight of Part A;

lauryl alcohol in an amount 0.8% by weight of Part A;

a pH buffering system; and water,

Part B comprises:

hydrogen peroxide in an amount 8% by weight of Part B;

one or more stabilizers; and water, and

Part C comprises:

a bleaching accelerator.

2. The chemical formulation according to claim 1, wherein the chemical formulation comprises each of the components in an amount sufficient for the chemical formulation to have an initial interfacial tension of the chemical formulation with beef grease of about 3.25 mN/m.

3. The chemical formulation according to claim 1, wherein the pH buffering system comprises potassium bicarbonate in an amount ranging from 0.3% to 12% by weight of Part A and caustic potash in an amount ranging from 0.0425% to 1.7% by weight of Part A.

4. The chemical formulation according to claim 3, wherein the chemical formulation comprises each of the components in an amount sufficient for the chemical formulation to have an initial interfacial tension of the chemical formulation with beef grease of about 3.25 mN/m.

5. The formulation of claim 1, consisting essentially of Part A, Part B and Part C in a ratio of 49:49:2.

6. The formulation of claim 5, wherein:

Part A consists essentially of:

a composition in an amount 4% by weight of Part A, the composition consisting of 80% active ingredients, namely:

32% by weight of n-alkyl-(40% C12, 50% C14, 10% C16)-dimethylbenzylammonium chloride, 24% by weight of n-octyldecyldimethylammonium chloride, 12% by weight of di-n-octyldimethylammonium chloride, 12% by weight of di-n-decyldimethylammonium chloride; and 20% inerts;

N, N, N,N', N'-pentamethyl-N'-(tallow alkyl)-trimethylenediammonium dichloride (50% active ingredient in ethanol) in an amount 2% by weight of Part A;

diethylene glycol monobutyl ether in an amount 1.6% by weight of Part A;

isobutanol in an amount 1% by weight of Part A;

propylene glycol in an amount 20% by weight of Part A;

lauryl alcohol in an amount 0.8% by weight of Part A;

potassium bicarbonate in an amount 12% by weight of Part A;

caustic potash in an amount 1.7% by weight of Part A; and water,

Part B consists essentially of:

hydrogen peroxide in an amount 8% by weight of Part B;

one or more stabilizers; and water, and

Part C consists essentially of:

a bleaching accelerator.

7. The chemical formulation of claim 1, consisting of Part A, Part B and Part C in a ratio of 49:49:2.

8. The formulation of claim 7, wherein:

Part A consists of:

a composition in an amount 4% by weight of Part A, the composition consisting of 80% active ingredients, namely:

32% by weight of n-alkyl-(40% C12, 50% C14, 10% C16)-dimethylbenzylammonium chloride, 24% by weight of n-octyldecyldimethylammonium chloride, 12% by weight of di-n-octyldimethylammonium chloride, 12% by weight of di-n-decyldimethylammonium chloride; and 20% inerts;

N, N, N,N', N'-pentamethyl-N'-(tallow alkyl)-trimethylenediammonium dichloride (50% active ingredient in ethanol) in an amount 2% by weight of Part A;

diethylene glycol monobutyl ether in an amount 1.6% by weight of Part A;

isobutanol in an amount 1% by weight of Part A;

propylene glycol in an amount 20% by weight of Part A;

lauryl alcohol in an amount 0.8% by weight of Part A;

potassium bicarbonate in an amount 12% by weight of Part A;

caustic potash in an amount 1.7% by weight of Part A; and water,

Part B consists of:

hydrogen peroxide in an amount 8% by weight of Part B;

one or more stabilizers; and water, and

Part C consists of:

a bleaching accelerator.

* * * * *